(12) United States Patent
Chambard et al.

(10) Patent No.: US 12,370,753 B2
(45) Date of Patent: Jul. 29, 2025

(54) METHOD FOR MAKING ELASTOMERIC ARTICLES

(71) Applicants: DOW SILICONES CORPORATION, Midland, MI (US); DOW GLOBAL TECHNOLOGIES LLC, Midland, MI (US)

(72) Inventors: Gregory Chambard, Seneffe (BE); Davide Dei Santi, Seneffe (BE); Thomas Davidian, Seneffe (BE); Frederic Gubbels, Seneffe (BE); Kevin Van Tiggelen, Seneffe (BE); Peter Hermann Roland Sandkuehler, Horgen (CH)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 603 days.

(21) Appl. No.: 17/634,929

(22) PCT Filed: Aug. 11, 2020

(86) PCT No.: PCT/US2020/045706
§ 371 (c)(1),
(2) Date: Feb. 11, 2022

(87) PCT Pub. No.: WO2021/030316
PCT Pub. Date: Feb. 18, 2021

(65) Prior Publication Data
US 2022/0274353 A1 Sep. 1, 2022

Related U.S. Application Data

(60) Provisional application No. 62/885,976, filed on Aug. 13, 2019.

(51) Int. Cl.
*B29C 69/02* (2006.01)
*B29C 33/68* (2006.01)
(Continued)

(52) U.S. Cl.
CPC .............. *B29C 69/02* (2013.01); *B29C 33/68* (2013.01); *B29C 39/24* (2013.01); *C08G 77/38* (2013.01);
(Continued)

(58) Field of Classification Search
CPC ..... E06B 3/663; B29C 37/0075; B29C 33/68; B29C 39/36; B29C 39/42; B29C 39/24; C08G 77/38; C08K 5/56
See application file for complete search history.

(56) References Cited

U.S. PATENT DOCUMENTS 3,616,839 A * 11/1971 Burrin ............... B32B 17/10798
156/99
5,534,588 A 7/1996 Knepper et al.
(Continued)

FOREIGN PATENT DOCUMENTS

CN 107974089 A 5/2018
DE 60116851 T2 11/2006
(Continued)

OTHER PUBLICATIONS

International Search Report for PCT/US2020/045706 dated Oct. 20, 2020, 3 pages.
(Continued)

*Primary Examiner* — Jacob T Minskey
*Assistant Examiner* — Elisa H Vera
(74) *Attorney, Agent, or Firm* — Warner Norcross + Judd LLP

(57) ABSTRACT

A method for molding shaped silicone elastomeric articles from room temperature curable silicone compositions,
(Continued)

Figure 1A:
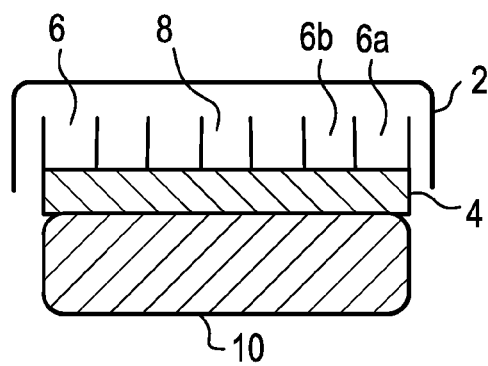

which are practically not suited to being processed using extrusion techniques, is provided. The method enables the room temperature curable silicone composition to cure in a predefined shape (6) into which it is introduced to form a shaped silicone elastomeric article. The articles may be, for the sake of example, suitable for use as spacers for insulating glass units (IGUs).

20 Claims, 5 Drawing Sheets

(51) Int. Cl.
  *B29C 39/24* (2006.01)
  *B29K 83/00* (2006.01)
  *C08G 77/38* (2006.01)
  *C08K 5/56* (2006.01)
  *E06B 3/663* (2006.01)

(52) U.S. Cl.
  CPC ............ *C08K 5/56* (2013.01); *E06B 3/66328* (2013.01); *B29K 2083/00* (2013.01)

(56) References Cited

U.S. PATENT DOCUMENTS

| | | | |
|---|---|---|---|
| 6,071,456 A * | 6/2000 | Hanamoto | B29C 45/1418 264/269 |
| 6,613,607 B2 | 9/2003 | Janssen et al. | |
| 8,938,300 B2 | 1/2015 | Rosero | |
| 9,671,217 B2 | 6/2017 | Metzler | |
| 2006/0186576 A1 | 8/2006 | Takase et al. | |
| 2007/0132135 A1 | 6/2007 | Takase et al. | |
| 2008/0213947 A1* | 9/2008 | Shimonaka | H01L 23/3121 257/E23.125 |
| 2010/0184129 A1 | 7/2010 | Dauth et al. | |
| 2014/0335634 A1* | 11/2014 | Kasai | B29C 37/0075 526/253 |
| 2014/0378612 A1* | 12/2014 | Dinkar | C08K 3/36 524/860 |
| 2015/0072139 A1 | 3/2015 | Morita et al. | |
| 2015/0321387 A1* | 11/2015 | Bravet | B29C 39/006 425/436 R |
| 2016/0368229 A1 | 12/2016 | Fernandes et al. | |
| 2017/0157803 A1* | 6/2017 | Kuma | B32B 27/20 |
| 2018/0009951 A1* | 1/2018 | Gubbels | A61K 47/34 |
| 2024/0116221 A1 | 4/2024 | Davidian et al. | |

FOREIGN PATENT DOCUMENTS

| | | |
|---|---|---|
| EP | 0651005 A1 | 5/1995 |
| JP | 2013084949 A | 5/2013 |
| JP | 2016066736 A | 4/2016 |
| WO | 2006033375 A1 | 3/2006 |
| WO | 2012119940 A1 | 9/2012 |
| WO | 2013154602 A1 | 10/2013 |
| WO | 2013162051 A1 | 10/2013 |
| WO | 2014075073 A1 | 5/2014 |
| WO | 2017191322 A1 | 11/2017 |
| WO | 2018160325 A1 | 9/2018 |
| WO | 2021030316 A1 | 2/2021 |

OTHER PUBLICATIONS

Machine assisted English translation of JP2013084949 obtained from https://patents.google.com/patent on Apr. 21, 2022, 10 pages.
International Search Report for PCT/US2002/016663 dated May 25, 2022, 4 pages.
Machine assisted English translation of CN107974089A obtained from https://worldwide.espacenet.com/patent on Aug. 14, 2023, 23 pages.
Machine assisted English translation of DE60116851T2 obtained from https://worldwide.espacenet.com/patent on Aug. 14, 2023, 13 pages.

* cited by examiner

METHOD FOR MAKING ELASTOMERIC ARTICLES

CROSS-REFERENCE TO RELATED APPLICATIONS

This application is the U.S. National Stage of International Application No. PCT/US2020/045706 filed on 11 Aug. 2020, which claims priority to and all advantages of U.S. Provisional Application No. 62/885,976 filed on 13 Aug. 2019, the content of which is incorporated herein by reference.

TECHNICAL FIELD

This disclosure relates to a method for making elastomeric articles from room temperature curable silicone compositions, which are practically not suited to being processed using extrusion techniques. The articles may be, for the sake of example, suitable for use as spacers for insulating glass units (IGUs).

BACKGROUND

It has been standard practice for many years to form transparent units such as insulating glass units (IGUs) consisting of two, three, or more glass panes with each adjacent pair of panes spaced apart using a suitable spacer and sealant combination applied by way of an "edge seal" process. The edge seal process provides a means of spacing adjacent panes apart whilst also providing a seal extending around the periphery of the inner facing surfaces of the glass panes to define a substantially hermetically sealed insulating space between the glass panes. In such an edge seal system a spacer is provided to space apart the panes of e.g., glass. Whilst spacers may self-adhere to the glass, most do not in which case satisfactory adhesion of the spacer to the glass panes is conventionally provided by way of a primary sealant. The spacer and primary sealant combination is designed to be moisture, vapour and/or gas impermeable, to prevent moisture or water vapour entering and condensing in the inner cavity of the unit and, in case of a gas filled unit, avoiding escape of gas from the unit. The so-called "primary" sealant may be e.g., a "butyl sealant" e.g., a polyisobutylene rubber-based material which is utilised to bond non-self-adhesive spacers e.g., metal spacers to the glass panes and to employ a secondary sealant bonded to the panes around the spacer.

The aforementioned secondary sealant, often a silicone sealant, is provided at the periphery of the insulating glass unit between the edge portions of the glass panes, such that the layer of secondary sealant is in contact with external surface of the spacer. The secondary sealant serves to promote the integrity of the bond of the self-adhered spacer or primary sealant by minimising the strain imposed on it due to external factors such as fluctuations in ambient temperature, barometric pressure, or wind pressure.

A wide variety of spacers have been proposed. Currently, more commonly non-adhesive spacers are utilised. These may include foamed plastics materials, for example a silicone foam or a polyolefin foam such as an ethylene propylene diene terpolymer foam; a mastic, for example a polyisobutylene mastic, containing a reinforcement which helps to keep the glass sheets the required distance apart when the insulating glass unit is assembled. Alternatively, the spacers may be made from rigid materials such as metals like aluminium or stainless steel or rigid plastic materials such as, for the sake of example, polycarbonate or polymethylmethacrylate (PMMA). These rigid spacers may be constructed to be hollow enabling desiccant to be introduced into the hollow region thereof.

For example, in one typical form of insulating glass unit construction, the edge seal comprises a hollow metal or plastic spacer element adhered to the inner facing surfaces of the glass panes by a primary sealant to provide a primary hermetic seal. The hollow spacer element is filled with a desiccant material, which is put in communication with the insulating space between the glass panes to absorb moisture therefrom in order to improve the performance and durability of the insulating glass unit.

Alternatively, self-adhering spacers may be utilised. These may include spacers made from thermoplastic materials and self-adhering silicone spacers such as those described in WO2018160325. During assembly of an insulating glass unit having a self-adhesive spacer, the spacer is applied as an elongate elastomeric "strand" which will adhere to the intended substrates with which it is to be used.

In use as a self-adhesive spacer for IGUs, the strand is applied onto a first of two glass panes along its edge. The beginning and the end of the strand may be joined. The second glass pane is then placed directly on top of the self-adhesive spacer the two panes are pressed together until they are a predetermined distance apart, equal to the width that the spacer is to have in the insulating glass unit, so that the strand of self-adhesive spacer is pressed against the glass panes and bonds the panes together. A secondary sealant or alternatively a protective coating or the like may then be applied if deemed necessary.

However, whilst until now the elongate strands have generally been prepared using an extrusion methodology the compositions described in WO2018160325, which are designed to be transparent, are unsuitable for extrusion techniques because they are condensation curable thermosetting materials which cure slowly and which have gel points which are not reached for at least several minutes from the start of the cure process and indeed in some instances the gel point is not reached for several hours. For the avoidance of doubt by gel point we mean the time when tan delta (G"/G') is 1 i.e., where G" (the storage or elastic modulus in shear) and G' (the loss or viscous modulus in shear) are equal. This represents the transition from a liquid to a solid material. Around this transition point the material is behaving as a viscoelastic material, which will deform differently according to the level of the stress that is applied to the material. Before the gel point, the material is very sensitive to any stress applied, which can induce flow thereof. Beyond the gel point a low stress applied will induce reversible deformation, i.e., the material will return to its initial position after the stress is removed. The gel point of a material may be determined using several alternative methods including, for the sake of example, by way of the tests in ASTM D4473-08 (2016).

The vast majority of non-adhesive spacers, self-adhesive spacers, primary sealants and/or secondary sealants utilised in edge-seal systems are black, white or opaque or even otherwise coloured, thereby reducing the area of the insulating glass unit through which light may pass.

There is therefore now a desire to produce transparent spacers for IGUs particularly when vision through the IGU is important, e.g., commercial fridge applications. Incumbent solutions mostly use a rigid clear plastic such as a polycarbonate or polymethylmethacrylate (PMMA) spacer that is fixed onto the glass via using a clear double-sided tape. However, this has a specific drawback, that of adhesion durability because as the plastic materials used are typically rigid, it has limited movement capability and any movement during transport or use can lead to loss of adhesion and consequently moisture can enter the inner cavity of the IGU leading to condensation and fogging.

The transparent silicone spacers described in WO2018160325 have much better adhesion durability than that of the aforementioned rigid plastic spacers due to their better flexibility and to the fact that the chemical adhesion of the silicone to the glass is maintained, even after prolonged periods of aging (e.g., high temperatures or hot water immersion).

As such there is a desire to manufacture elongate silicone molded articles suitable for use as spacers from room temperature curable silicone compositions by means of a method which does not involve the need for extrusion.

SUMMARY

There is provided herein a method for molding shaped silicone elastomeric articles from room temperature curable silicone compositions, comprising:
(i) draping a film over a mold comprising two or more predefined shapes to establish an evacuatable volume between the film and each predefined shape in the mold;
(ii) applying suction to the evacuatable volume between a first predefined shape of the mold and the film to establish an at least partial vacuum within the evacuatable volume of said first predefined shape, such that the film forms a filmic inner lining conforming to the first predefined shape of the mold;
(iii) additionally, applying suction to the evacuatable volume between a second predefined shape of the mold and the film, which second predefined shape, is adjacent to the first predefined shape, to also establish an at least partial vacuum within the evacuatable volume of said second predefined shape and consequently also forms a filmic inner lining conforming to the second predefined shape of the mold;
(iv) sequentially repeating step (iii) until each predefined shape in the mold has an at least partial vacuum within the evacuatable volume thereof and the film forms a filmic inner lining conforming to each respective predefined shape of the mold;
(v) introducing room temperature curable silicone composition onto the filmic inner lining conforming to one or more predefined shapes of the mold, which composition is designed to flow sufficiently to conform to the predefined shape in the mold into which it has been introduced; and
(vi) enabling the room temperature curable silicone composition to cure in the predefined shape into which it was introduced to form a shaped silicone elastomeric article.

The method described above is intended for use with materials which are impractical to prepare via extrusion processes such as the room temperature curable silicone compositions described in WO2018/160325 having gel points of from several minutes to several hours which are therefore not sufficiently structurally resilient during the initial stages of the cure process to be used to prepare elongate "strands". by extrusion. This is particularly the case if the composition once mixed has a low enough viscosity to be flowable, a likely scenario when minimal or no filler is present in the composition. Furthermore, these compositions cure via a condensation process over an extended period of time e.g., from several hours to several days, e.g., 7 days or longer, typically by a condensation process.

For the avoidance of doubt a flowable room temperature curable silicone composition has a viscosity which is sufficiently low immediately prior to commencement of the cure process to visibly flowable under the influence of gravity and/or be even self-levelling. By structural resilience we mean the ability to hold its structural form in the absence of e.g., a mold or other form of support.

The method described above provides a suitable route for the manufacture of shaped silicone elastomeric articles e.g., elongate silicone elastomeric articles from room temperature curable silicone composition. It is desirable to produce elongate silicone elastomeric articles with parallel sides, for example, to be used as spacers in insulating glass units (IGUs) which avoids the need to rely on an extrusion process. Hence, the above method provides a means of producing shaped silicone elastomeric articles, especially elongate silicone elastomeric articles e.g., spacers, from room temperature curable silicone compositions, which may be flowable at the commencement of cure. The articles e.g., pre-cured spacers described in WO2018160325, are both self-adhesive and transparent and as such this method, when using compositions as described therein or similar compositions provides a means for the manufacture of self-adhesive transparent spacers, which once introduced into insulated glass units provide the viewer with a better viewing capability.

The method of the present disclosure utilises a mold and a film because it would be undesirable to leave the one or more predefined shapes in the mold filled with room temperature curable silicone composition for the whole cure period, unless deemed necessary, as potentially adhesion problems between the elastomer and the mold walls might occur and as a consequence would potentially result in damage to the elongate shape of the cured silicone elastomer articles when eventually removed from the mold post cure.

The mold, as used herein, comprises two or more predefined shapes. In one embodiment the two or more predefined shapes are two or more elongate parallel channels, alternatively a series of elongate parallel channels in a mold. In such an instance the predefined shape may be of any suitable cross-section, but rectangular, alternatively square cross-sections to provide cured or partially cured elongate silicone elastomeric articles with at least two parallel sides are preferred. For example, in one embodiment, when the intended end use for the resulting cured articles is as spacers for IGUs, the parallel channels are formed by walls which are of a height greater than that desired for the molded articles, e.g., at least 5 mm higher than molded articles. The walls may be of any suitable construction e.g., they may have rounded or sharpened edges.

The shaped silicone elastomeric articles can be designed to be of any desired shape and size, i.e., in order to be suitable for their end use. In the case of elongate silicone elastomeric articles such as spacers for IGUs they may for example, be 7.5 to 25 mm wide, alternatively 10 mm to 25 mm wide and 5 to 25 mm deep, alternatively 10 to 25 mm deep, alternatively 10 to 20 mm deep. The length of the elongate silicone elastomeric articles can be anything up to the full length of the channel in which it is being molded. Indeed, if required, after the completion of cure, the length of the article may be cut to size or cut into multiple different lengths. However, for example the article may be e.g., from 0.5 to 3 m in length, alternatively from 1 to 2.5 m in length.

When the or each predefined shape in the mold is an elongate channel, the elongate channel may have a rectangular cross-section or alternatively a square cross-section with a substantially horizontal base, alternatively a horizontal base, a first side wall and a second side wall. The first side wall and the second side wall are substantially vertical or vertical, parallel to each other and are positioned approximately perpendicular or alternatively perpendicular to the base.

Each of the two or more predefined shapes in the mold contain a series of openings designed to enable an at least partial vacuum to be established by evacuating air and/or other gases from the respective evacuatable volume created by draping the film over the respective predefined shape in the mold. The openings may be of any suitable cross-section but are typically of a circular, square or rectangular cross-section, alternatively a circular cross-section. When the holes have a circular cross-section, they may have a diameter of from 0.5 to 3 mm, alternatively 0.5 to 2 mm.

In one embodiment when the two or more predefined shapes are a series of elongate parallel channels in the mold, each parallel channel having a base and a first and second parallel side walls at an angle of approximately 90° to the base, the openings are positioned at a set distance apart along one or both side walls and/or in the base of the channel. Alternatively, the openings are positioned a set distance apart in the corner(s) between the base and the first side wall and a set distance apart in the corner(s) between the base and the second side wall. The positioning of said openings are important as they ensure that the film conforms to the shape of the mold once suction is applied to the evacuatable volume. Hence, in one alternative, the openings may be, or are equidistantly distributed along the length of each channel of the mold to enable a consistent vacuum to be drawn along the whole length of the respective channel.

The suction applied causes a vacuum to be drawn through the openings to evacuate gases from the evacuatable volume of the pre-defined shape (e.g., channel) and consequently draws the film into the predefined shape (e.g., channel). The film used is designed to conform to the shape thereof to create a filmic inner lining in the respective predefined shape, e.g., channel. The vacuum drawn in any one predefined shape may be drawn independently from vacuum in each other predefined shapes in the mold. This may be achieved by having an on/off switch for vacuum to be operated for each individual channel.

Any suitable type of vacuum generator may be used for the application of a vacuum in the evacuatable volume of between a predefined shape and the film of a mold. For example, venturi tubes (using compressed air or water flow) or vacuum pumps, One suitable vacuum generator from the above list may be utilised per mold providing suitable switching mechanisms are available to enable suction to be initiated in a predefined shape independent from all other predefined shapes in the mold. Alternatively, if desired or deemed necessary, a separate vacuum generator may be utilised with respect to each predefined shape.

In one embodiment the mold may comprise a single unit having a mold part and a vacuum part wherein the vacuum part is connected to a suitable vacuum generator as described above and is designed to draw a vacuum through the openings in the respective predefined shape. Alternatively, the mold part and the vacuum part may be two inter-connectable parts which, in use, are engaged in order for a vacuum to be applied into the evacuatable volume between the film and a predefined shape but enabling the vacuum part to be disconnected as and when the vacuum is deemed no longer required. Hence, the vacuum part may be detachable e.g., such that whilst the mold is being used to mold the final article during the lengthy cure period the vacuum part may be reused with additional molds which may be fixable placed on top of the vacuum part with the openings aligned thereto to enable a vacuum to be drawn as described elsewhere.

The film utilised herein to form the filmic inner lining in the preformed shapes of the mold may be any suitable film for such a purpose. Films were selected based on three main criteria:
 (i) the ability to conform to the predefined shapes in the mold via the method used herein without being damaged or stretched;
 (ii) the avoidance for the need to heat the film to gain adequate conformity thereof to the predefined shapes
 (iii) being releasable from the self-adhesive silicone elastomer article generate post-cure.

In one embodiment the film material used may be chosen with respect to its "wettability" by the room temperature curable silicone composition to be introduced into the predefined shapes, in that it is desired for the composition to have a minimal meniscus when the film is functioning as an internal layer of the mold, i.e., when the composition has flowed under gravity into position the composition/air interface is approximately horizontal. Suitable films of this type include, for the sake of example, polyethylene (PE) especially low-density polyethylene (LDPE), polyethylene terephthalate (PET), polytetrafluoroethylene (PTFE) and fluorinated ethylene-propylene (PEP). If desired said films may be modified to incorporate additives such as, for the sake of example, slip additives and/or anti-block agents. By wettability we mean the ability of a liquid to maintain contact with a solid surface, resulting from intermolecular interactions when the two are brought together. The above were found to be suitable because these films did not have a negative impact on the adherence properties of the spacer when applied on glass. It was found that some films depending on
 (i) their film surface functional groups,
 (ii) different surface species or
 (iii) different orientation of the surface species could impact how the spacer adheres on glass post-cure. The film may be a release film.

The film is preferably highly flexible and has a film thickness of from 10 to 100 μm, alternatively from 20 and 70 μm (thinner films tend to crinkle whereas thicker films do not conform well onto surface).

The film used herein may be treated prior to use to enhance adhesion or other properties to the mold surface at room temperature and maintain its position even in the absence of vacuum. This may be by application of an adhesive such as a NUCREL™ acid copolymer adhesive product from Dow or a surface treatment (e.g., corona or plasma activation). In one embodiment the surface of the film to be in contact with the mold surface is corona or plasma treated prior to use as a means of enhancing the conformability of the film to the predefined shapes in the mold.

When each predefined shape in a mold is an elongate channel as previously described, each channel in a mold has two ends. Both ends may be fixed in place or may alternatively be open-ended or one end is fixed in place and the second end is open-ended. Whichever is the case, a slidable guide may be utilised in order to vary the length of the elongate predefined shape (e.g., channel). It may also act as a guide for the film to ensure it retains its desired position because it was found to be a significant challenge to maintain the position of the film in each respective predefined shape of the mold to avoid stretching of the film and/or non-conformity thereof to the predefined shape resulting in causing a negative effect on the shape of the elongate silicone elastomeric articles resulting from curing room temperature curable silicone composition in the predefined shape (e.g., a channel). The film is required to form a filmic inner lining which conforms to the shape of each predefined shape of the mold. The slidable guide has also been found, when in use, to enable vacuum to be pulled more consistently/efficiently within its respective evacuatable volume. When multiple elongate silicone elastomeric articles of the same length are required the slidable guide may be provided in a comb design used to act as the channel end and guide for the film in multiple adjacent channels in a single mold. Preferably the slidable guides are a tight fit in each channel therefore acting as a barrier to prevent the escape or leakage of room temperature curable silicone composition, especially if/when flowable, prior to curing sufficiently from its dimensionally unstable initial form. If the slidable guide is not deemed sufficiently liquid tight a plug of suitable material may be inserted between the guide, when inserted in the mold, and the room temperature curable silicone composition once added into a predefined shape of the mold to avoid leakage of the room temperature curable silicone composition therefrom during the early stages of cure when potentially flowable. The plug may be made from e.g., a fast curing 1-part silicone sealant, foam plugs preferably having closed cells and other suitable materials such as putty. The plug is introduced onto the filmic inner lining, prior to introduction of the room temperature curable silicone composition.

In use, a film is initially draped over the mold to establish an evacuatable volume between the film and each predefined shape, e.g., a channel in the mold. The film is then drawn into each predefined shape in the mold, conforming to the mold by suction through the openings caused by a vacuum generator resulting in the film becoming a filmic inner lining in each predefined shape in the mold conforming to the shape of the predefined shape. The use of a film in this way prevents elastomer adhering to the walls of the mold during cure and consequently preventing damage/mechanical failure of a shaped silicone elastomeric article upon removal from the predefined shape. The film may also be utilised to remove the resulting shaped silicone elastomeric article or a partially cured molded article out of the predefined shape in which it has been molded.

In one embodiment the film initially draped over the mold is fixed in place at one edge of the mold. When the film has been clamped, the first channel to which a vacuum is applied is that adjacent to the fixing means such that when suction occurs through openings in the channel discussed above, the film is drawn into the aforementioned channel to form a filmic inner lining which conforms to the shape thereof. Once this is complete in said first channel the method is repeated in the adjacent channel until suction is applied in each channel and the film is acting as a filmic inner lining conforming to the shape of each channel. Once this has been completed the room temperature curable silicone composition may be introduced into each channel. The fixing of the film may be undertaken by clamping the film:
 a. At one extremity of the mold, or
 b. Along the wall of a channel not located near the extremity of the mold.
Preferably, clamping is done by use of a single clamping means along the whole length of the mold or in the case of a series of elongate channels along the whole length of said first channel. Alternatively, a plurality of clamping means may be used spaced apart along the length of the first elongate channel, however, the former is preferred.

In one embodiment the film used for molding the elongate elastomeric articles can be used as packaging of the silicone molded part.

The room temperature curable silicone composition used herein to form elastomeric articles may be any suitable room temperature curable silicone composition, which preferably does not contain any inorganic reinforcing filler and as such which may be flowable at the commencement of the cure process. For example, the composition utilised may be the same or similar to those used for making spacers in WO/2018/160325 which is incorporated herein by reference. The compositions are 2-part room temperature curable silicone compositions which produce suitable elastomeric articles. The room temperature curable silicone composition may comprise:
 (i) at least one condensation curable silyl terminated polymer having at least one, typically at least 2 hydrolysable and/or hydroxyl functional groups per molecule;
 (ii) a cross-linker selected from the group of
  silanes having at least 2 hydrolysable groups, alternatively at least 3 hydrolysable groups per molecule group; and/or
  silyl functional molecules having at least 2 silyl groups, each silyl group containing at least one hydrolysable group.
 (iii) a condensation catalyst selected from the group of titanates and zirconate; characterized in that:
  the molar ratio of hydroxyl groups to hydrolysable groups is between 0.1:1 to 4:1
  and the molar ratio of M-OR functions to the hydroxyl groups is from 0.01:1 and 0.6:1, where M is titanium or zirconium.

The composition is stored in two-parts prior to use to avoid premature curing and then the two-parts are mixed in a predefined ratio (e.g., a weight ratio) immediately prior to use Immediately after mixing the resulting viscosity of the composition may sufficiently low for the composition to be flowable. In one example of WO2018/160325, part A of the composition was merely a 13,500 mPa·s (at 25° C.) silanol terminated polydimethylsiloxane and part B of the composition or cure package comprised
 100 weight parts of a 2,000 mPa·s trimethoxysilyl terminated polydimethylsiloxane (at 25° C.) and
 0.3 weight parts of tetra-n-butyl titanate, per 100 weight parts of said trimethoxysilyl terminated polydimethylsiloxane.

Cured materials were prepared by mixing the two components of the composition together in a Base:curing agent weight ratio of 3:1 after mixing in a speed mixer 4 times 30 seconds at a speed of 2300 rpm. In the present disclosure such a composition once mixed as described is introduced into the predefined shapes in the mold lined with the film.

The room temperature curable silicone composition may be gunnable, i.e., it is introduced manually or otherwise into each channel by application of a sealant gun. In the event the composition is introduced by means of a robotic or other automated system the operator thereof can set the exact amount of the composition to be introduced into each channel to ensure that each molded article is identical or substantially identical. This is particularly the case when the composition is flowable and as such will flow/settle under gravity into the shape of the mold. It is therefore very important for this application to ensure that the filmic inner lining is well positioned (no clearance between film and mold) and does not affect the shape of the final molded article. Clearance between film and mold may result in a U-shaped cross-section, which if significant, in the case of use as a spacer in an insulated glass unit, may limit contact between the spacer and the glass pane adjacent to it and as a consequence there may be mechanical failure of the spacer (adhesion failure vs. cohesive failure). In order to avoid applying tension and stretching the film, the applied film is sucked in the mold with vacuum and positioned channel by channel. This ensures that even if vacuum is cut the film can remain in place and the molded article can retain its intended shape. In case the mold is made of two different parts, place the upper part of the mold on the bottom part (base) and lock it to ensure there will not be leaks. Some molds (e.g., PVC) can be in 1 piece with the top part being fixed on the base. In that case the two-parts are always assembled. Prior to use the mold is placed on a horizontal surface to ensure the room temperature silicone composition, once added is distributed evenly with a view to obtaining an elastomeric article of a standard thickness along the whole length of the channel.

In accordance with the present disclosure there is provided an alternative method to extrusion, the current standard method for preparing elongate spacer materials which is required due to the lack of initial structural resilience of the room temperature curable silicone composition used to prepare the shaped silicone elastomeric articles and the extended cure process which takes from several hours to several days, e.g., seven days or more. The method herein utilises a mold and a film to overcome the problems of preparing said shaped silicone elastomeric articles, e.g., elongate silicone elastomeric articles from a potentially flowable room temperature curable silicone composition to form an elastomer having soft mechanical properties. When these are elongate spacers for insulating glazing units, they must have two substantially parallel or parallel sides, preferably of a defined length, width and depth to concur with the dimensions required for the spacer in the insulated glazing unit and/or a combination thereof.

For this to be achieved, the two or more predefined shapes in the mold are usually in the form of a series of elongate parallel channels. The film which is initially draped over the series of elongate parallel channels is required to be drawn into each predefined shape to form a filmic inner lining conforming to the shape of the channel. The mold is designed so that vacuum is applied in a manner which avoids damaging or stretching the film which may cause deformation of an elastomeric article molded therein. Deformation can occur if, for example, the film does not conform exactly to the predefined shape in a mold prior to introduction of the room temperature curable silicone composition therein.

It was determined that this is best achieved by applying the vacuum sequentially as described above i.e., in the case of a mold with two predefined shapes in a first predefined shape and then when the film has conformed to the shape of the first defined shape, maintain the vacuum in the first shape and commence the vacuum in the walls of the second defined shape in the mold. This means the film can slide/glide into a position in the second defined shape to form a filmic inner lining conforming to the shape of the second defined shape without damage/stretching of the film conforming to either or both defined shapes.

Hence, when the two or more predefined shapes in a mold are a series of elongate parallel channels, say, for example, a series of seven channels with channels being numbered from one to seven sequentially from right to left in the mold, then the vacuum is first pulled in channel one or channel seven. For the sake of simplicity, it is assumed that vacuum is first pulled in channel one. As the vacuum is pulled the film draped over the mold is drawn into channel one to form a filmic inner lining conforming to the shape of channel one. Once this is completed satisfactorily, the vacuum in channel one is maintained and the vacuum in channel two, adjacent to channel one is commenced and the method is repeated until the film is satisfactorily positioned in the channels one and two and then the method is repeated for channels three to seven sequentially such that when the vacuum is pulled in channel seven the vacuum is being maintained in the preceding six channels and the film is conforming to the shape of each of the respective channels. Once the film has been brought into conformance with each channel a selected room temperature curable silicone composition is introduced into each channel in any order in the mold.

Using this sequential application of vacuum channel by channel approach ensures that even if vacuum is cut once the film is in place as a filmic inner lining of each desired shape in the mold, the film remains in place conforming to the predefined shapes in the mold.

In the method described herein the following steps might be undertaken:—

(i) Provide a film of suitable dimensions. It should be of proportions suitable to easily form a filmic inner lining to all predefined shapes in the mold without the need for stretching or damage so that it may easily conform to the shape of all the predefined shapes. Clamp the film e.g., on the side of the first predefined shape into which vacuum will be applied.

(ii) In order to avoid air leaking via the two open extremities of the channels when vacuum is drawn, comb-like tools may be utilised, if so one may be placed at each end of the channels in close contact with the film thereby having the dual role of being a film guide but also closing any air gaps which could negatively affect the positioning of the film and drawing of the vacuum.

(iii) Turn on the vacuum generator e.g., a pump or Venturi and open a valve in said vacuum system such that suction is only applied to the first predefined shape in the mold (i.e., first channel). Once the suction commences the film is drawn into the predefined shape to form a filmic inner lining which may then be checked for any wrinkles or other defects with a view to ensuring said first predefined shape is ready for introduction of the room temperature curable silicone composition.

(iv) Once satisfied the valve in the vacuum line opening into the adjacent second predefined shape in the mold (e.g., channel) is also opened and the above step repeated. The same is then completed sequentially until all the predefined shapes (e.g., channels) have a vacuum drawn and a respective filmic inner lining conforming to the shapes thereof.

(v) If the aforementioned comb-like tool is considered not to be sufficiently well fitting in the channels to prevent the room temperature curable silicone composition from leaking out of the channel into which it is supplied, a plug of suitable material, e.g., a fast curing 1-part silicone sealant, foam plugs having closed cells and other suitable materials such as putty.

(vi) Subsequent to the above the room temperature curable silicone composition may be introduced into the predefined shapes having filmic inner linings in the mold. The room temperature curable silicone composition is usually stored in two-parts prior to use to avoid premature commencement of the cure process. The two-parts, typically referred to as part A and part B are mixed together in the required weight ratio, using a suitable mixer.

(vii) Once the room temperature curable room temperature curable silicone composition has been mixed it is dispensed into the predefined shapes in the mold and the room temperature curable silicone composition is then allowed to cure.

The composition is left to cure in the mold until it is deemed to have sufficient mechanical strength to maintain its shape without the need of the mold any longer. This period will depend on the content of the composition being used to make the elastomeric articles but for a composition that cures over say about one week the curing composition is typically left in the mold for 1 to 4 days, alternatively 1.5 to 3 days at room temperature.

After this period the partially cured material may be removed from the mold whilst retaining it in the film and the cure process is allowed to continue for as long as required and/or deemed necessary, again at room temperature.

Subsequent to completion of the cure process the resulting elongate elastomeric articles may be packaged and shipped for end use.

As previously discussed elastomeric articles prepared by the above described process are suitable as spacers in insulated glass units. To be suitable for use as spacers in insulated glass units the elongate articles need to have two at least substantially parallel sides and as such an alternative process has been developed which is suited for low viscosity compositions requiring extended periods of time for curing. The provision of such clear spacers can significantly improve the viewing capability for a person e.g., looking into a display unit such as a fridge. It is important that the spacer is in good contact with the glass windows as malformed rounded shapes will not adhere properly to the glass.

A typical spacer is designed to keep two panes of glass apart and in this disclosure, there is a strong adhesive bond between each pane of glass and the spacer. In many warm edge type sealing solutions, a primary sealant is required to adhere the spacer to a glass substrate. In the present case, such sealants may not be required.

If the shaped silicone elastomeric articles resulting from the method as described herein may be sufficiently tacky to the touch given the presence of excess hydrolysable groups for physical adhesion to occur when the substantially cured or fully cured silicone-based material is brought into contact with a substrate surface. However, if the level of adhesion is not deemed strong enough the substrate may be pre-treated to enhance adhesion between the shaped silicone elastomeric articles produced from the process herein.

The method described herein will now be described in connection with one or more embodiments together with the Figures appended hereto. For the avoidance of doubt discussion with respect to any one particular embodiment or associated feature is not intended to be limiting thereto. The reader will appreciate that there are numerous variations and equivalents that will be made apparent from the discussion that follows. Those variations and equivalents are intended to be encompassed by the scope of the present invention as if described herein.

DRAWINGS

Figure 1B:
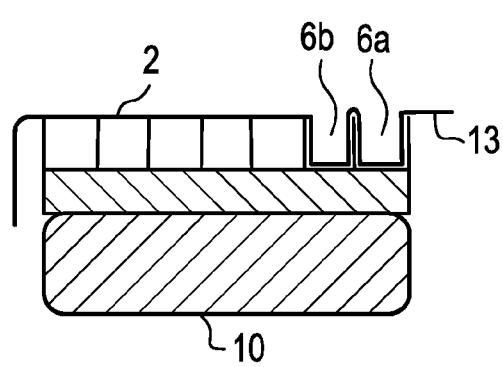
Figure 1C:
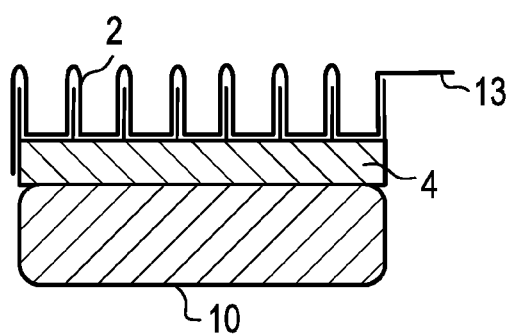
Figure 1D:
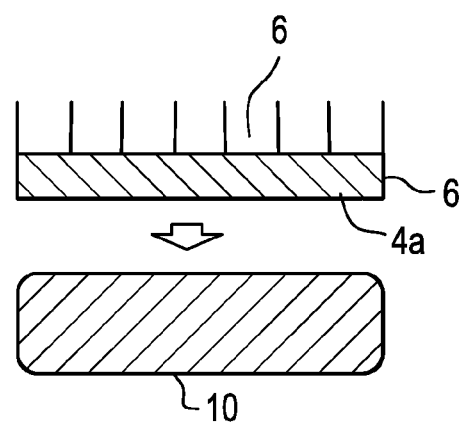
Figure 2:
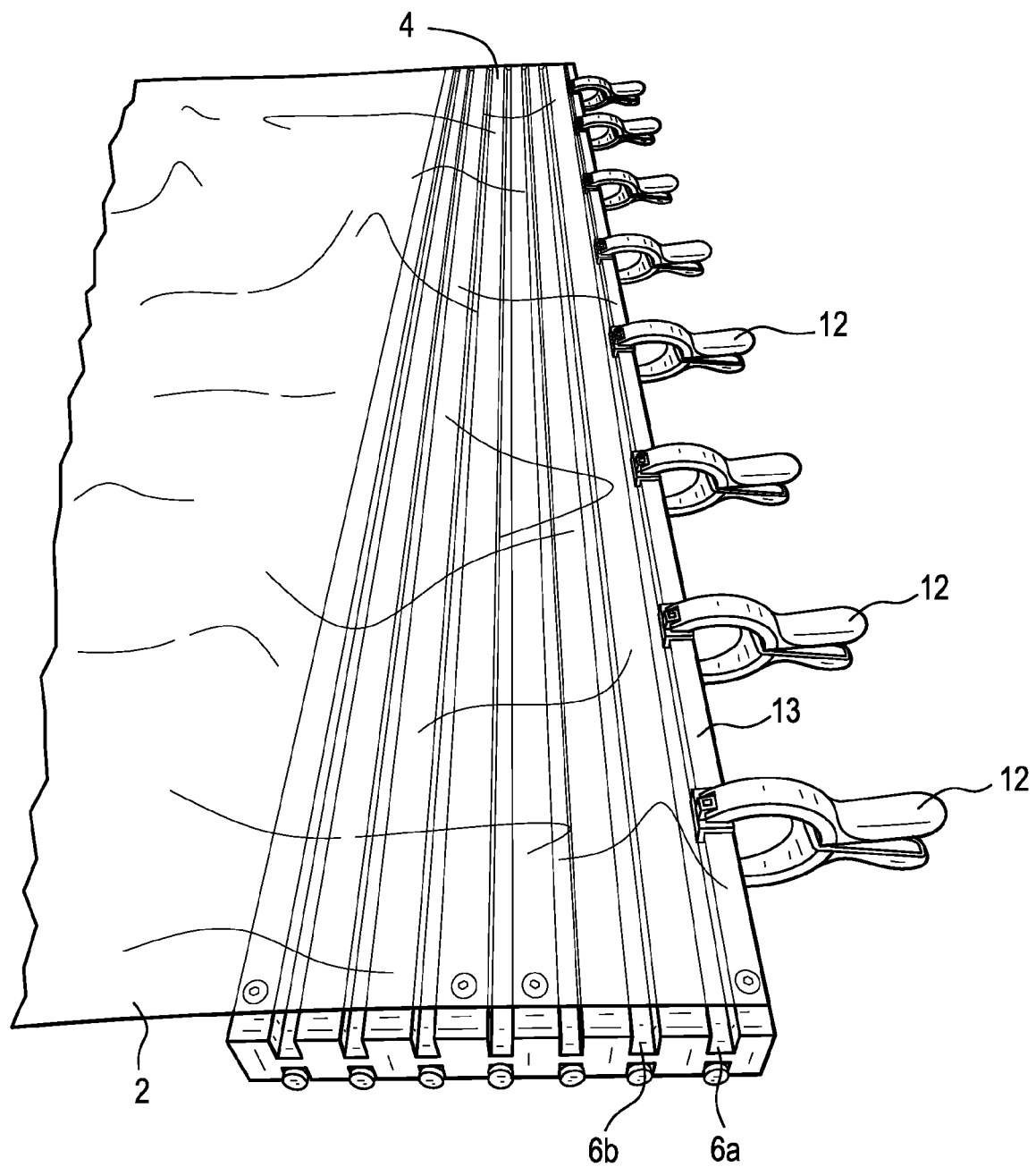
Figure 3:
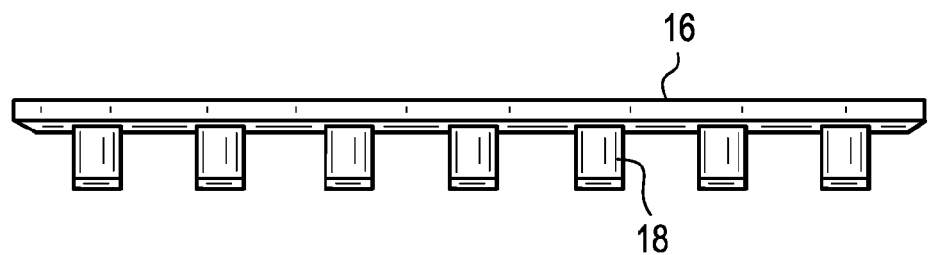
Figure 4:
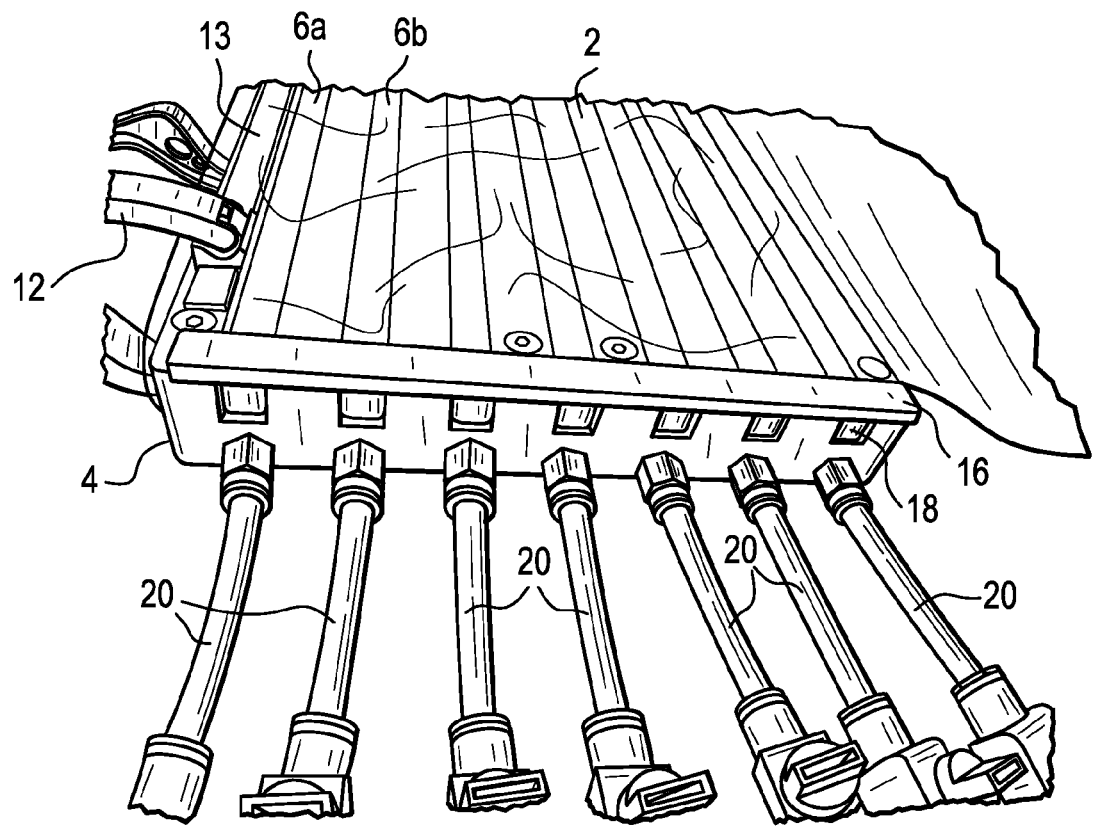
Figure 5:
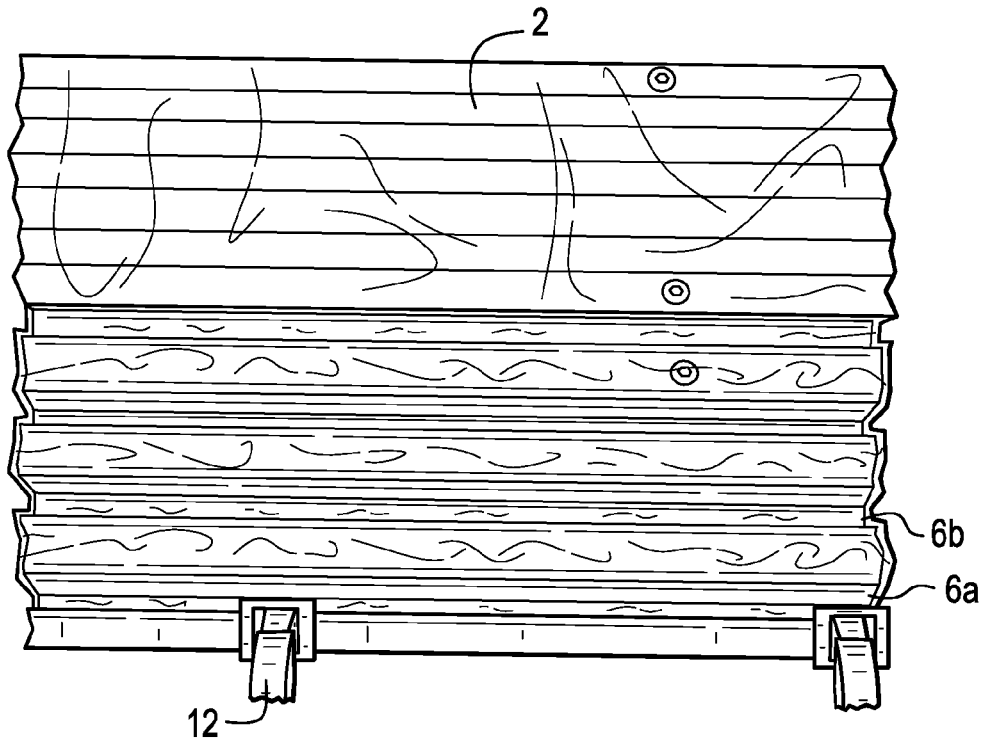
Figure 6:
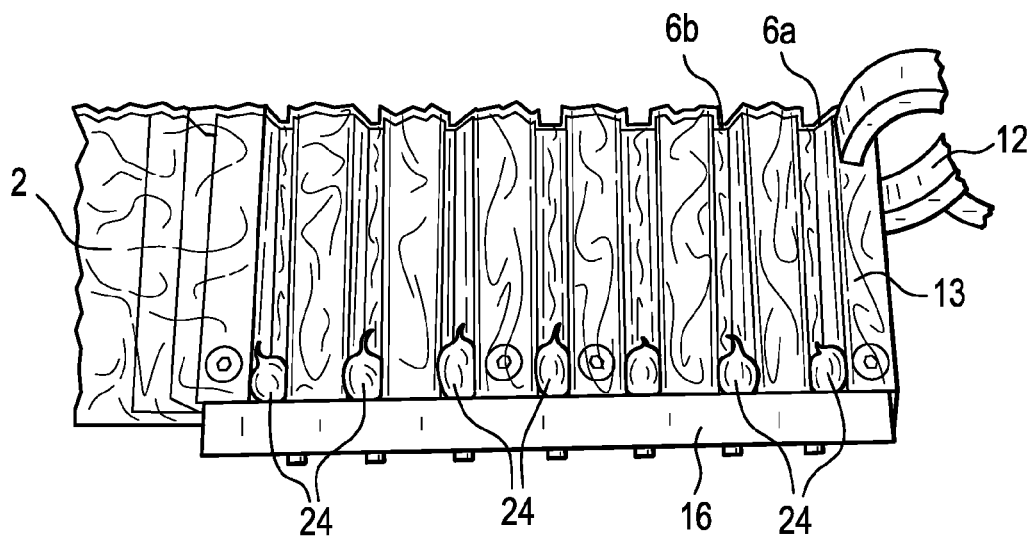
Figure 7:
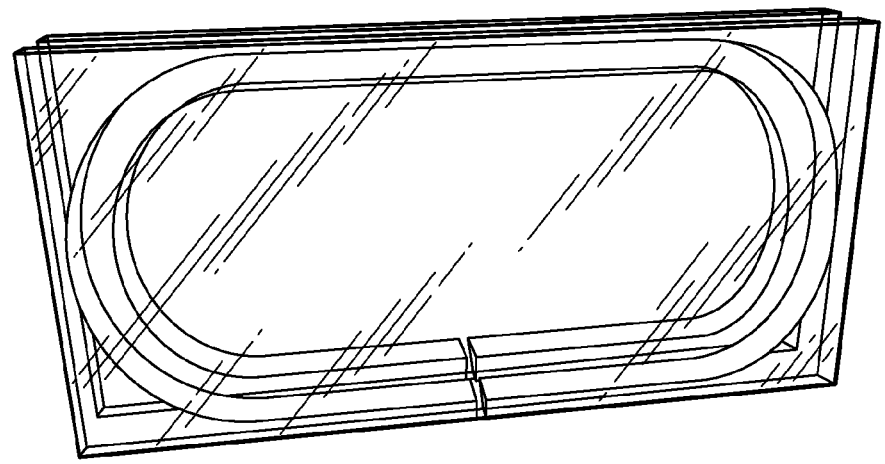

There follows a brief description of the figures in which
FIGS. 1a to 1c depict the stages involved in conforming the film into predefined shapes in a mold;
FIG. 1d depicts a two-part mold;
FIG. 2 is an overhead view of a mold having seven channels with film clamped at one edge using multiple clamps spaced equidistantly and otherwise draped over the mold;
FIG. 3 depicts an example of a comb like tool;
FIG. 4 is an end overhead view showing a mold having seven channels with film clamped at one edge, draped over the mold having the comb like tool in position;
FIG. 5 is an overhead view of a mold during introduction of the film into the predefined shapes; and
FIG. 6 is an overhead view of a mold in use with the ends plugged during the cure of the room temperature cure composition;
FIG. 7 is an illustration of a spacer of the type which can be made by the process herein in use spacing apart two panes of glass

DETAILED DESCRIPTION

Whilst each predefined shape may be the same or different for the sake of the following description of the Figures, each predefined shape is an elongate channel in a mold having a rectangular cross-section. The mold contains a plurality of these channels which are parallel to each other and which are designed to produce elongate spacer materials for use in e.g., insulating glazing. It will be appreciated that such a system is merely for example.

The Figures herein depict the stages and apparatus involved in conforming a film (2) to form a filmic inner lining in a series of channels (6) in a mold (4) and then molding a room temperature curable silicone composition which may be flowable at commencement of cure, which has an extended cure time of at least several hours but typically several days, in the channels (6) previously lined with the film (2).

Initially as can be seen in FIG. 1a, a film (2) is draped over mold (4) comprising, in the present example, seven channels (6) to establish an evacuatable volume (8) between the film and each channel (6) in the mold (4). The channels may, for the sake of example be 2 m long, 12.5 mm wide and 18 mm deep. A series of holes (not shown) are provided in the side walls, corners and/or base of each channel (6). Each hole is linked to a vacuum system (10) for drawing a vacuum in the respective channel (6) which is intended to draw the film (2) into the channel to form a filmic inner lining in the channel (6). The vacuum system (10) is designed so that a vacuum may be drawn in each channel independent of whether or not a vacuum is being drawn in one or more other channels. This may be achieved by having an individual vacuum system for each channel but is preferably operated by having a single vacuum system and a switchable valve designed to control the vacuum drawn in each channel independent of the other channels.

The holes are dispersed across each channel in a pattern designed to ensure the film (2) is made to conform to the walls of the predefined shape without damage to the film (2), which as discussed previously might lead to the cure of spacer units of damaged or incorrect dimensions.

As is seen in FIGS. 1b, 1c and 2 the film (2) is clamped to one edge of the mold (4). Preferably, a bar (13) is fixed along the whole length of the first channel, as depicted by the bar (13) which in FIG. 2 is fixed in place by the approximately equidistant clamps (12).

In use, after the film (2) has been draped over the mold (4) and clamped at one edge, suction is initiated in the channel (6a) adjacent to the clamped edge causing the evacuatable volume (8) in said channel (6a) to be evacuated and film to be drawn into the channel (6a). Once the film is lining channel (6a) to the satisfaction of the operator, the suction is initiated in the next adjacent channel (6b) i.e., the second closest to the clamping means (12, 13) and adjacent to channel (6a), whilst maintaining the vacuum in channel 6a. The process is repeated until the film (2) is lining both channels 6a and 6b to the satisfaction of the operator after which the vacuum in the next channel is initiated and the process repeated. This happens e.g., in FIGS. 1b and 2 sequentially with respect to each channel (6) from right to left of the picture until the vacuum has been applied in all channels (6) and the film (2) is forming a filmic inner lining in each channel (6) conforming to the shape of its respective channel (6) to the satisfaction of the operator (FIG. 1c) at which point in time the room temperature curable silicone composition may be introduced into the mold (4) and allowed to cure.

In one embodiment as depicted in FIG. 1d, the mold (4) may be in two separable parts a mold part (4a) and a vacuum part or unit (10) such that while one mold (4a) is being used solely to shape room temperature curable silicone composition during the curing process of several hours to several days, it can be detached from the vacuum unit (10) providing application of suction is no longer required. This therefore enables the vacuum unit (10) to be reused to line a further mold (4a) in the manner described above. It was found particularly suited to utilise this embodiment when the mold/vacuum unit was made from metal, whilst when substantially manufactured in plastic the mold unit was preferably a single unit.

It was found that in one embodiment, specific to the method when, as shown herein, the mold (4) comprises a series of adjacent, parallel channels (6), that the introduction of a "tooth" (18) from a comb like tool (16) as depicted in FIG. 3, at each end of each channel (6) was advantageous. This tool (16) functioned as both a guide for the film (2) to prevent damaging the film (2) during the lining stage, but the teeth (18) thereof also acted as an end means causing an improved/consistent vacuum to be drawn in each channel (6) as and when required. The comb-like tool (16) may be made from any suitable material but is preferably non-stick to the cured silicone elastomer end-product and as such may be made from e.g., polytetrafluoroethylene (PTFE), polyvinyl chloride (PVC), low density polyethylene (LDPE) or even from metals such as steel or aluminium.

In use one tooth (18) from tool (16) is inserted into the mold (4) at the end of each channel (6) as depicted in FIG. 4 prior to the introduction of any vacuum to any channel (6). For the benefit of the reader FIG. 4 also depicts one potential vacuum arrangement with a vacuum line (20) visible and attached to each channel (6). Such a vacuum line (20) to each channel (6) is operable by the turning of a switch to apply the vacuum in each respective channel (6). This may be automated or may be operable manually by the operator, as required.

FIG. 5 depicts a partially evacuated mold (4) having four out of seven channels (6) lined by the film (2) and having vacuum applied whilst in three channels (6) the vacuum is yet to be applied and the film remains draped thereon.

It was found that whilst the comb-like tool (16) is beneficial as a guide and/or as an effective end of each end of the channel (6), thereby defining the length of the elongate elastomer once the composition has cured; it was found that the teeth (18) were not necessarily sufficiently well-fitting to prevent leakage of room temperature curable silicone composition from the mold (4) during early stages of the cure process when it does not have sufficient structural resilience to maintain the shape of the channel if removed therefrom. Any suitable means may be utilised to prevent said leakage, however, it was found that one simple methodology was to introduce a plug (24) of disposable fast curing one-part sealant between tooth (18) of tool (16) and the subsequently introduced room temperature silicone curable composition. Plugs (24) of this type are shown in FIG. 6 which depicts one end of a mold during the cure process of the room temperature curable silicone composition.

Subsequent to the above, the room temperature curable silicone composition may be introduced into the predefined shapes, i.e., channels (6) in the mold (4). The room temperature curable silicone composition is usually stored in two parts prior to use to avoid premature commencement of the cure process. The two-parts, typically referred to as part A and part B are mixed together in the required ratio, usually in a suitable two-part mixer suitable to mix low viscosity liquids (not shown), e.g., a Conti Flow Vario 2-component Mix and dispense system from Reinhardt-Technik GmbH of Kierspe Germany or a Graco EFR 2-part dispensing pump from Graco Inc. of Minnesota, USA. The chosen two-part mixer is suitable to mix part A and part B at a predefined weight ratio through a disposable static or dynamic mixer.

Once the room temperature curable silicone composition has been added to each channel (6), vacuum may be stopped and the room temperature curable silicone composition left to cure in the mold for 1 to 3 days until it has sufficient structural resilience to maintain its shape without the need of the mold (4). This period will depend on the content of the room temperature curable silicone composition being used to make the elastomeric articles but for a composition that cures over say about one week the curing composition is typically left in the mold for 1 to 4 days, alternatively 1.5 to 3 days at room temperature. If desired, the room temperature curable silicone composition may be heated up to a temperature of about 80° C. to accelerate the cure process. After this period, the partially cured material may be demolded from the mold (4) whilst keeping it in the film (2) and the cure process is allowed to continue for as long as required and/or deemed necessary to complete the cure process, again typically at room temperature but cure can be accelerated by further heating up to a maximum of about 80° C.

Alternatively, the vacuum may be kept on continuously in the mold (4) for 1 to 3 days until the room temperature curable silicone composition has cured to an extent to have sufficient structural resilience. In a further embodiment, it is also possible to stop vacuum temporarily (to e.g., move the mold to a storage location) and start vacuum again during part of the curing time. Subsequent to completion of the cure process the resulting elongate silicone elastomeric articles may be packaged and shipped for end use.

When the elongate silicone elastomeric articles are to be used as spacers for IGUs, spacer quality may be analysed, if deemed necessary, by removing the spacer form the film, slicing a +/−1 mm piece with a blade in order to obtain a cross-section of the elongate silicone elastomeric articles e.g., spacer. Analysis thereof may be undertaken using an optical microscope. The vertical and horizontal clearances may be measured, if desired. For the avoidance of doubt, "clearance" is defined as the length of the spacer that is not conforming to the shape of the channel in which it was cured due to constraints created by improper film conformation on the surface of the respective predefined shape in the mold. The surface regions which do not conform due a clearance issue will not adhere well to glass and therefore adhesion defects may occur and the cohesive strength of the spacer on a glass substrate is more than likely reduced.

When the elongate silicone elastomeric articles have fully cured they may be used as not only self-adherent pre cured silicone spacers to assemble transparent units or devices such as insulating glass units, but also in electronic displays, weather sealants, optical devices, light emitting diodes, lenses etc.

The elongate silicone elastomeric articles prepared by the enclosed method using compositions described in WO2018160325 will provide self-adherent transparent spacers. In some cases, the final strength of the transparent spacer will be sufficient for the application, whilst in others the use of an additional structural adhesive will be required on top and/or bottom to ensure sufficient strength of the IGU. The high transparency of the pre-cured spacer applied using the present method will contribute to anaesthetically pleasing spacer which is visibly clear.

It is to be appreciated that such transparent spacers can be used for building transparent internal partitions, transparent windows and doors, especially for refrigerators, where thermal insulation is desired. The resulting pre cured spacer produced using the method hereinbefore described, can also be useful for assembling cold or hot bended glass units, where the use of a structural spacer is a clear attribute. If transparent articles can be assembled, non-transparent articles can also be considered in combination or not with transparent articles. The transparent spacer may have decorative, optical and or electronic devices fully or partially incorporated into the body of the spacer prior to curing. Said devices are then cured in the normal manner as previously discussed. The resulting cured transparent spacer produced using the method hereinbefore described, will then have said devices visible therein or on thereon unless hidden from view behind a frame for e.g., security reasons.

The transparent structural spacer produced using the method hereinbefore described, can also be useful to assemble articles, which are sensitive to temperature, ultra-violet or liquids. It can be useful to assemble electronic articles, optical devices, displays made of glass, metals or plastics. It is useful to assemble panels together for internal partition in building but as well for facades and roofs. They may also be useful for assembling articles in appliance, automotive or aerospace, especially where transparency is desirable.

Hence, substrates which may be spaced apart by spacers produced using the method hereinbefore described, may include glass sheets for flat panel displays (LED, LCD screens), glass panels for facades or cars, metal, plastic, wood, concrete or stone plates for construction, automotive, electronics etc. metal, plastic, wood, concrete fixations, like hooks, screws, nuts. If necessary, the substrates may be additionally primed if it is necessary to physically enhance the level of adhesion between the spacer and a substrate.

Insulated glass units may comprise one or more than one spacer. For example, spacers produced using the method hereinbefore described, might be used for articles of a unit which an opaque or coloured spacer would otherwise obscure but other standard spacers might be used in areas where the spacer material will not obscure the vision of the user looking through the unit.

It will be noted that generally the units described are referred to as glass units, it should be understood that whilst glass has been used as an example any alternative transparent materials may be used, if appropriate to the situation. Furthermore, in some instances the insulated glazing unit might comprise one or more transparent panes of glass or the like and one pane which is rendered opaque due to patterning or the like.

The present disclosure also extends to a method of making insulated glazing units using elongate elastomeric articles as made by the method as hereinbefore described as spacers, by providing a first pane of glass having a first major surface and a second pane of glass having a first major surface.

Applying an elongate elastomeric article as prepared using the method described herein e.g., as an (optionally transparent) spacer onto the first major surface of the first glass panel.

Positioning the region of the first major surface of the second glass panel onto the spacer and leaving the spacer to adhere to the glass surfaces. If required, then filling a cavity around the periphery of the glass panels, with a preferably transparent secondary sealant, which may be a moisture-curable hot melt silicone adhesive composition, said cavity defined by the first major surface of the first glass panel, external surface of transparent spacer and the first major surface of the second glass panel. Alternatively, rather than a secondary sealant a protective coating may be applied onto the outer surface of the elastomeric article/spacer to form a protective non-stick layer with a view to preventing damage to the article/spacer in use.

In one embodiment an insert made of plastic, metal, glass or the like may be added into one or more channels before the introduction of the room temperature curable silicone composition in order to provide the resulting elongate silicone elastomeric articles, e.g., transparent spacers with physical support that can protect the spacer from any mechanical damage in use. Such an insert may alternatively be introduced into a channel after the room temperature curable silicone composition either before or during cure. This support may alternatively be provided after cure, in which case a primer or the like may be required to obtain good adhesion between the pre-cured spacer and the insert.

In one embodiment of the above there is provided a method of making an insulating glass unit comprising the following steps carried out in any desired order namely procuring two glass panes, providing between the two glass panes an endless strip of spacer as prepared by way of the method hereinbefore described, urging the two glass panes towards each other against the spacer to form a spacer adherent to the panes.

EXAMPLES

Cured materials were prepared by mixing the two components of the composition together in a Base:curing agent weight ratio of 3:1. The base component was:
 a 2,000 mPa·s (at 25° C.) silanol terminated polydimethylsiloxane. The curing agent components were:
  100 weight parts of a 2,000 mPa·s trimethoxysilyl terminated polydimethylsiloxane (at 25° C.) and
  0.2 weight parts of tetra-n-butyl titanate.

The material was mixed in a speedmixer 4 times 30 seconds at a speed of 2300 rpm and the resulting mixture was utilised as described above by addition into the molds and then being allowed to cure for seven days. An example of the type of spacer which might be generated using the method described above is provided as FIG. 7 which depicts two panes of glass separated by a continuous ribbon of the cured material adhered to the periphery of the of each glass panes effectively functioning as spacer between the two panes of glass.

The upper surface of the lower glass pane depicted and the lower surface of the upper glass pane may be coated with a primer type material such as DOWSIL™ 1200 OS primer which was allowed to dry for approximately 30 minutes.

A pre-measured ribbon of cured self-adhesive elastomeric article as prepared by the method as hereinbefore described was applied to the periphery of the upper surface of the lower glass pane and subsequently the lower surface of the upper pane of glass was adhered to the cured material in the regions previously primed. Almost immediately after construction the glass unit depicted in FIG. 7 could be moved and handled without impairing the structure of the construction because of the strength of the bonds formed as described herein.

The invention claimed is:

1. A method for molding elongate shaped silicone elastomeric articles from room temperature curable silicone compositions, the method comprising:
   (i) draping a film (2) over a mold (4) comprising two or more predefined shapes (6) to establish an evacuatable volume (8) between the film (2) and each predefined shape (6) in the mold (4);
   (ii) applying suction to the evacuatable volume (8) between a first predefined shape (6a) of the mold (4) and the film (2) to establish an at least partial vacuum within the evacuatable volume (8) of said first predefined shape (6a), such that the film (2) forms a filmic inner lining conforming to the first predefined shape (6a) of the mold (4);
   (iii) additionally, applying suction to the evacuatable volume (8) between a second predefined shape (6b) of the mold (4) and the film (2), which second predefined shape (6b), is adjacent to the first predefined shape (6a), to also establish an at least partial vacuum within the evacuatable volume of said second predefined shape (6b) and consequently also forms a filmic inner lining conforming to the second predefined shape (6b) of the mold (4);
   (iv) sequentially repeating step (iii) until each predefined shape (6) in the mold (4) has an at least partial vacuum within the evacuatable volume (8) thereof and the film (2) forms a filmic inner lining conforming to each respective predefined shape (6) of the mold (4);
   (v) introducing room temperature curable silicone composition onto the filmic inner lining conforming to one or more predefined shapes (6) of the mold (4), which composition is designed to flow sufficiently to conform to the predefined shape (6) in the mold (4) into which it has been introduced; and
   (vi) enabling the room temperature curable silicone composition to cure in the predefined shape (6) into which it was introduced to form an elongate shaped silicone elastomeric article;
   wherein the elongate shaped silicone elastomeric articles are suitable for use as spacers in the manufacture of insulated glazing units.

2. The method in accordance with claim 1, wherein the predefined shapes (6) are elongate channels having a base and a first wall and a second wall, which first and second wall are substantially parallel to each other and perpendicular to the base.

3. The method in accordance with claim 2, wherein the parallel walls have round edges and are designed to be greater in depth than the depth of the elastomeric article to be cured in the mold (4).

4. The method in accordance with claim 2, wherein a guide (16) is inserted at each extremity of the channels to guide the film (2) into its respective channel (6) and/or to adjust the length of one or more channels (6) in the mold (4).

5. The method in accordance with claim 1, wherein the film (2) is fixed to one edge of the mold (4).

6. The method in accordance with claim 5, wherein the film (2) is clamped at either one extremity of the mold (4), or along a wall of a channel not located near the extremity of the mold (4).

7. The method in accordance with claim 5, wherein the fixing is achieved by clamping the film (2) using a single clamp (12) along the length of the mold (4) or using a bar (13) fixed in place by a series of clamps (12) positioned equidistant from each other along the length of the mold (4).

8. The method in accordance with claim 1, wherein the mold (4) is a one part unit or is in two detachable parts, a top or mold part (4a) and a bottom or vacuum part (10) in each case adapted such that vacuum can be effectively drawn through holes in the base and/or walls of the predefined shape (6).

9. The method in accordance with claim 1, wherein plugs (24) are inserted into a channel (6) to prevent room temperature curable silicone composition from flowing or leaking out of the channel (6) in which it was introduced.

10. The method in accordance with claim 1, wherein an insert is added into one or more channels (6):
    (i) before introduction of the room temperature curable silicone composition;
    (ii) after the room temperature curable silicone composition is introduced either before or during cure; or
    (iii) after cure, wherein optionally a primer is utilised to enhance adhesion between the pre-cured elongate shaped silicone elastomeric article and the insert.

11. The method in accordance with claim 1, wherein the film (2) has a thickness of from 20 to 70 μm.

12. The method in accordance with claim 1, wherein the film (2) is selected from the group consisting of polyethylene (PE), low-density polyethylene (LDPE), polyethylene terephthalate (PET), polytetrafluoroethylene (PTFE), and fluorinated ethylene-propylene (FEP).

13. The method in accordance with claim 1, wherein the film (2) used for molding the room temperature curable silicone compositions is also used as packaging of the elongate shaped silicone elastomeric articles.

14. The method in accordance with claim 1, wherein the film (2) is treated by application of a coating or a surface treatment.

15. The method in accordance with claim 1, wherein the room temperature curable silicone composition comprises:
    (i) at least one condensation curable silyl terminated polymer having at least one, optionally at least 2, hydrolysable and/or hydroxyl functional groups per molecule;
    (ii) a cross-linker selected from the group consisting of silanes having at least 2, optionally at least 3, hydrolysable groups per molecule; and/or
       silyl functional molecules having at least 2 silyl groups, each silyl group containing at least one hydrolysable group; and
    (iii) a condensation catalyst selected from the group consisting of titanates and zirconates; wherein;
       the molar ratio of hydroxyl groups to hydrolysable groups is between 0.1:1 to 4:1, and
       the molar ratio of condensation catalyst (iii) M-OR functions to the hydroxyl groups is from 0.01:1 and 0.6:1, where M is titanium or zirconium and R is an aliphatic hydrocarbon group.

16. The method in accordance with claim 15, wherein the elongate silicone elastomeric articles formed by the method are self-adherent, and optionally transparent, spacers suitable for use in the manufacture of insulated glazing units.

17. The method in accordance with claim 1, wherein the elongate silicone elastomeric articles formed by the method have a rectangular cross-section, the rectangular cross-section being 7.5 to 25 mm wide and 5 to 25 mm deep, optionally wherein the elongate silicone elastomeric articles have a length of from 0.5 to 3 meters.

18. An elongate shaped silicone elastomeric article obtainable or obtained by the method in accordance with claim 1.

19. An insulated glass unit comprising an elongate shaped silicone elastomeric article prepared by the method in accordance with claim 1, wherein the elongate shaped silicone elastomeric article is a spacer in the insulated glass unit.

20. The method in accordance with claim 1, further defined as a method of making insulated glazing units and further comprising:
(vii) providing a first pane of glass having a first major surface and a second pane of glass having a first major surface;
(viii) applying an elongate elastomeric article formed in step (vi) onto the first major surface of the first glass panel;
(ix) positioning the first major surface of the second glass panel onto the elongate elastomeric article which thereby serves as a spacer between the panes of glass; and
(x) leaving the spacer to adhere to the first major surfaces of glass;
(xi-a) optionally, filling a cavity around a periphery of the spaced panes of glass with a secondary sealant after step (x) to further adhere the first major surfaces of glass, where the cavity is defined by the first major surface of the first pane of glass, external surface of the spacer, and the first major surface of the second pane of glass; or
(xi-b) optionally, applying a protective coating onto an outer surface of the spacer after step (x) to form a protective non-stick layer to prevent damage to the spacer.

* * * * *